(12) United States Patent
Sakaguchi (10) Patent No.: US 6,490,057 B1
(45) Date of Patent: Dec. 3, 2002

(54) IMAGE PROCESSING APPARATUS AND IMAGE PROCESSING METHOD, AND STORAGE MEDIA THEREOF

(75) Inventor: Tomoyuki Sakaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/335,683

(22) Filed: Jun. 18, 1999

(30) Foreign Application Priority Data

Jun. 19, 1998 (JP) .......................................... 10-188067

(51) Int. Cl.[7] .............................. H04N 1/36; H04N 1/04
(52) U.S. Cl. ...................................... 358/412; 358/474
(58) Field of Search .............................. 358/412, 474, 358/1.2; 382/298, 299

(56) References Cited

U.S. PATENT DOCUMENTS

| | | | | |
|---|---|---|---|---|
| 4,233,636 A | * | 11/1980 | Harbaugh et al. | 358/451 |
| 4,275,450 A | * | 6/1981 | Potter | 358/451 |
| 4,682,243 A | * | 7/1987 | Hatayama | 358/451 |
| 4,686,580 A | * | 8/1987 | Kato et al. | 358/451 |
| 4,916,747 A | | 4/1990 | Arimoto | 382/47 |
| 5,157,515 A | | 10/1992 | Hasegawa | 358/412 |
| 6,400,854 B1 | * | 6/2002 | Kudoh | 382/312 |

FOREIGN PATENT DOCUMENTS

| | | |
|---|---|---|
| EP | 0 767 577 A2 | 4/1997 |
| JP | 53-11601 | 2/1978 |
| JP | 50-52920 | 5/1978 |
| JP | 59-229549 | 12/1984 |
| JP | 61-121661 | 6/1986 |
| JP | 61-173574 | 8/1986 |
| JP | 62-249564 | 10/1987 |
| JP | 3-198470 | 8/1991 |
| JP | 6-054170 | 2/1994 |
| JP | 5-316305 | 11/1996 |
| JP | 11-355517 | * 12/1999 |

* cited by examiner

Primary Examiner—Edward Coles
Assistant Examiner—Houshang Safaipour
(74) Attorney, Agent, or Firm—Foley & Lardner (57) ABSTRACT

An image processing apparatus and an image processing method, and a storage media thereof which enable an image read-out by a scanner to be enlarged with arbitrary scale factor in a horizontal scanning direction and a vertical scanning direction. An analog signal which corresponds to an enlarged image obtained by changing scanning speed in a vertical scanning direction according to scale factor is inputted to an A/D converter to be converted into digital image data, before to be supplied to a line memory. The image data is read-out synchronized with a thinned-out pulse outputted from a horizontal scanning thinned-out pulse generator to be outputted synchronized with one-pixel pulse. A vertical scanning enable signal generator thins-out vertical scanning pulse according to scale factor in the vertical scanning direction, before outputting signal indicating whether the image data corresponding to one line outputted from the line memory is effective while thinning-out the vertical scanning pulse according to the scale factor in the vertical scanning direction.

9 Claims, 10 Drawing Sheets

IMAGE PROCESSING APPARATUS AND IMAGE PROCESSING METHOD, AND STORAGE MEDIA THEREOF

BACKGROUND OF THE INVENTION

The present invention relates to an image processing apparatus and an image processing method, and storage media thereof. More to particularly, this invention relates to an image processing apparatus and an image processing method, and storage media thereof in which image can be enlarged in the horizontal scanning direction and in the vertical scanning direction with arbitrary scale factor by rendering the scanning speed of the vertical scanning direction variable.

DESCRIPTION OF THE PRIOR ART

Figure 1:
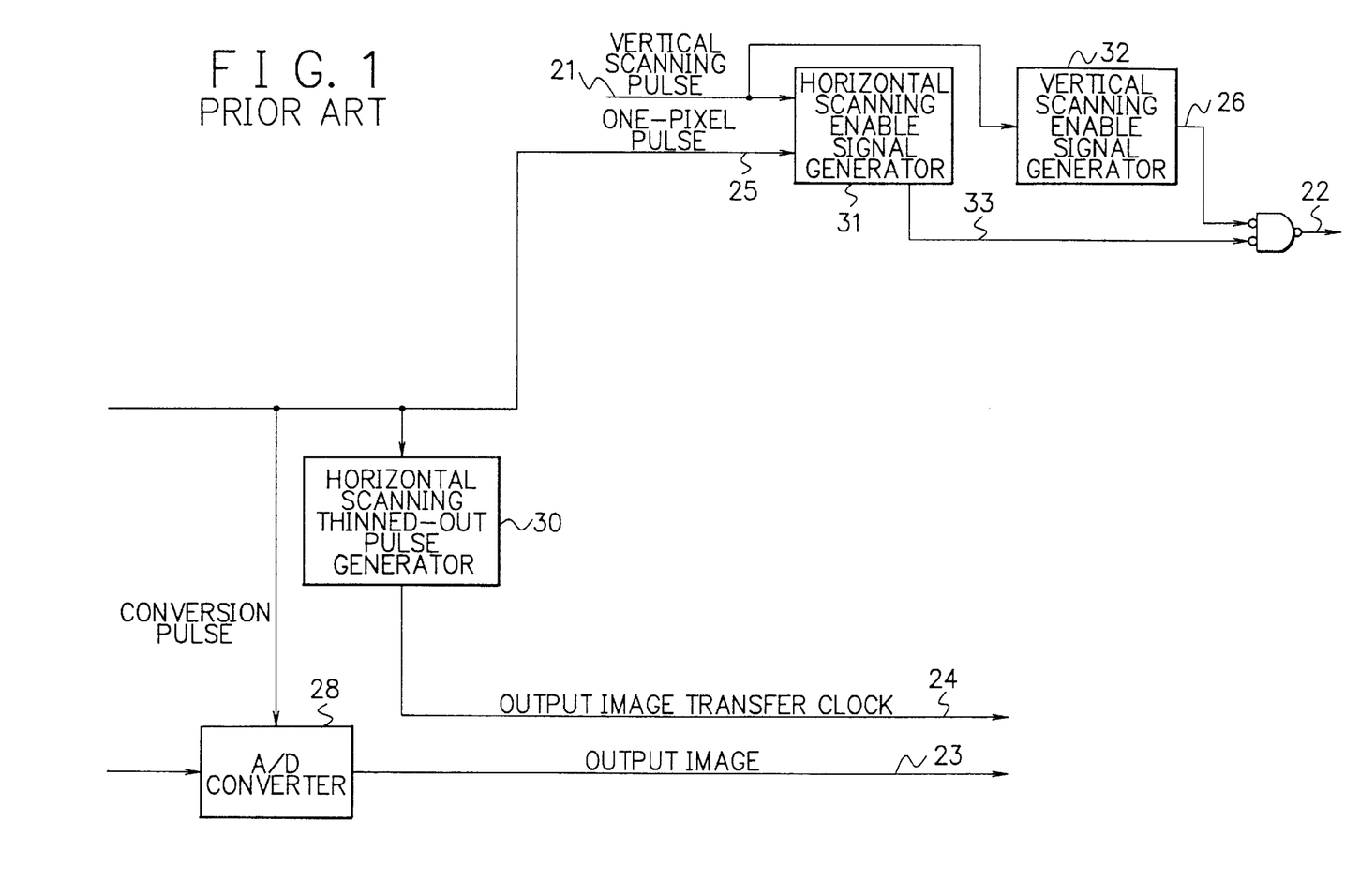
FIG. 1 is a block diagram showing a configuration of one example of the conventional scanner.

FIG. 1 is a configuration view showing a configuration example of a multi-gradation image reduction processor for reducing an image in the conventional scanner. An A/D converter 28 converts an analog signal supplied from a photoelectric conversion element into a digital multi-image data. A horizontal scanning thinned-out pulse generator 30 thins out one-pixel pulse 25 according to reduction factor to output as an output image transfer clock 24. A horizontal scanning enable signal generator 31 generates a horizontal scanning enable signal 33 for specifying effective pixel in the direction of horizontal scanning from both of a vertical scanning pulse 21 and the one-pixel pulse 25. A vertical scanning enable signal generator 32 thins out the vertical scanning pulse 21 according to reduction factor to output a vertical scanning enable signal.

Figure 2:
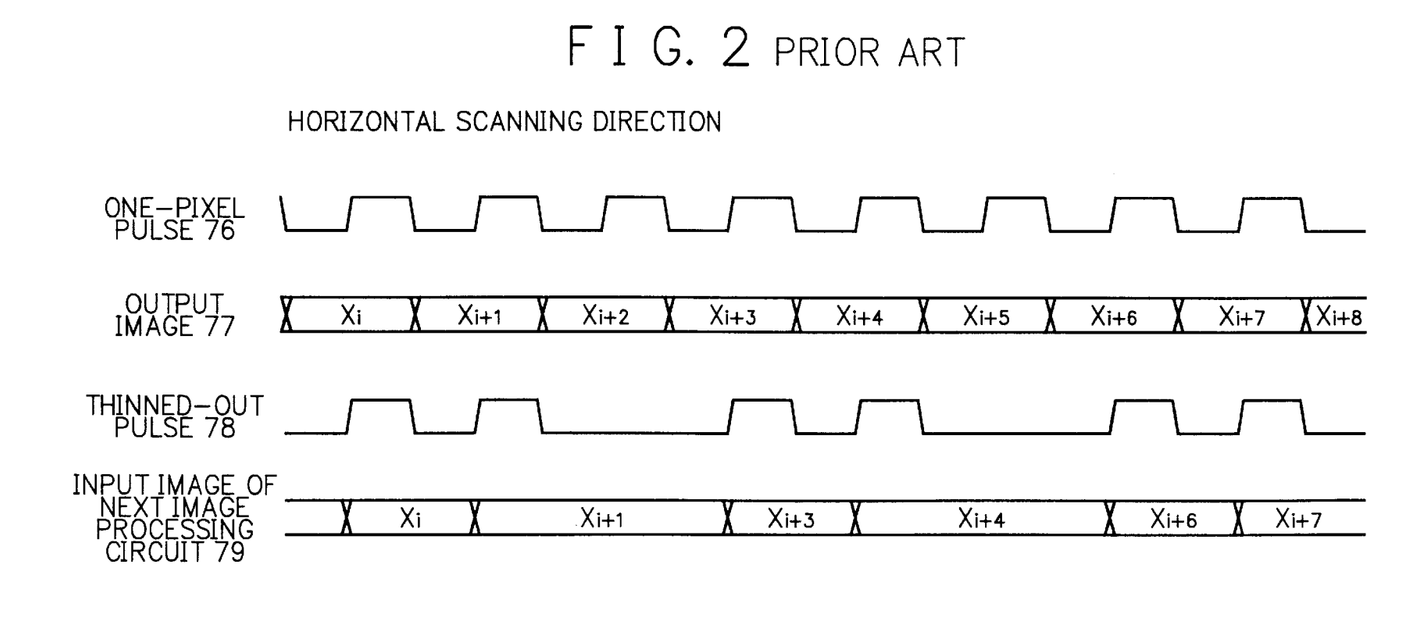
FIG. 2 is a timing chart showing operation of the scanner of FIG. 1.

FIG. 2 is a timing-chart showing the timing of signal of the conventional multi-gradation image reduction processor shown in FIG. 1. As shown in the timing-chart, the A/D converter 28 converts the image before reduction in every one-pixel into an output image 23 (output image 77 of FIG. 2) consisting of multi-gradation digital value. Subsequently, the horizontal scanning thinned-out pulse generator 30 thins-out the one-pixel pulse 25. The thinned-out pulse is taken to be the output image transfer clock 24 (thinned-out pulse 78 of FIG. 2) for next stage of image processing (for instance, processor for performing gamma correction or binarization). Whereby, this configuration realizes reduction of the image.

Further, formerly, the Japanese Patent Application Laid-Open No. SHO 59-229549 discloses method for providing scanner capable of obtaining enlarged image. Combination is performed between dilation in the horizontal scanning direction according to movement of zoom lens of optical system and dilation in the vertical scanning direction of alteration of movement speed of the carriage.

In such the method, when it is intended to obtain an enlarged image with arbitrary scale factor, it is necessary to equip a mechanical section for moving the zoom lens accurately according to required scale factor, and a mechanical section for altering continuously movement speed of the carriage.

However, when the movement speed of the carriage is to alter continuously in wide range, if the stepping motor is used, the pulse frequency is to alter continuously, thus there is the problem that a control circuit thereof becomes complicated.

Further, the stepping motor has large vibration. For instance, when the stepping motor is driven with pulse frequency of one/(integer number) or pulse frequency of (integer number) times greater of natural vibration number of the mechanical section, the mechanical section resonates, with the result that there is the problem of influencing bad influence to the image obtained.

In the Japanese Patent Application Laid-Open No. HEI 3-198470, in order to achieve these problems, the method for reducing the vibration is proposed. The method for reducing the vibration is that it is intended to reduce the range of the pulse frequency in such a way that it causes the drive system of the stepping motor to be altered according to the enlargement factor. However, in this method, it is necessary to alter the pulse frequency continuously in some degree of range, thus it is incapable of being avoided influence of resonance completely. Also, there is the defect that drive circuit thereof becomes complicated.

A device by which those problems are overcome and realization of low cost is achieved is used practically as the well known technique. The device is that the scale factor in the horizontal scanning direction is fixed, and also the movement speed of the carriage is fixed. In the device, the image data is stored in a semiconductor memory once, at the time of read-out, the pixel just before in the horizontal scanning direction is inserted and the line just before in the vertical scanning direction is inserted, thereby the enlarged image is realized.

However, there are problems to be solved as following:

The first problem is that for instance, as disclosed in the Japanese Patent Application Laid-Open No. SHO 59-229549, combination between the method according to movement of optical lens and the method according to alteration of movement speed of the carriage brings the device into complicated, thus it is difficult to constitute the device at the low cost.

Because high accurate mechanism is necessary for moving zoom lens, and speed of the motor for movement of carriage should be controlled according to the scale factor (for instance, at the time of enlargement of 200%, motor speed is to reduce to 50% of the same scale of 100%, or at the time of 141%, motor speed is to reduce to 71% of the same scale of 100%), therefore the circuit for controlling motor becomes complicated. Further, in case of usage of the stepping motor for the sake of movement of the carriage in order to constitute the device cheaply, mechanism for suppressing vibration becomes necessary because the stepping motor is accompanied with large vibration. Furthermore, when carriage movement speed is variable over the wide range, vibration source occurs in various kinds of frequency elements, it becomes more difficult to suppress vibration.

The second problem is that the stepping motor becomes vibration source of various kinds of frequency elements although the method disclosed in the Japanese Patent Application Laid-Open No. HEI 3-198470 is executed in order to improve the first problem. Because even though the method of the Japanese Patent Application Laid-Open No. HEI 3-198470 is executed, it is necessary to render the pulse frequency variable continuously within some degree of the range.

The third problem is that the above described well known method brings picture quality into deteriorated at the time of enlargement. Because an enlargement processing in the multi-gradation image greatly enlarges the size of the image memory. For that reason, the image memory is compelled to realize by a binary image which is binarization-processed with the technique of the error diffusion and/or the dither method.

SUMMARY OF THE INVENTION

In view of the foregoing, it is an object of the present invention, in order to overcome the above-mentioned problems, to provide an image processing apparatus and an image processing method, and a storage media thereof which equips a scanner capable of enlarging of a multi-gradation image with arbitrary scale factor.

In accordance with a first aspect of the present invention, in order to achieve the above-mentioned object, there is provided an image processing apparatus which scans a manuscript in order to read-out an image of the manuscript comprising a storage means for storing an image data corresponding to one line in a horizontal scanning direction, a first generation means for generating prescribed reference pulse, a second generation means for generating a thinned-out pulse obtained in such a way that the reference pulse is thinned-out with a prescribed rate, a read-out means for reading-out the image data stored in the storage means according to either the reference pulse or the thinned-out pulse, an output means for outputting the image data read-out by the read-out means according to either the reference pulse or the thinned-out pulse, a first changeover means for changing to be supplied either one between the reference pulse and the thinned-out pulse to the read-out means a second changeover means for changing to be supplied either one between the reference pulse and the thinned-out pulse to the output means a control means for controlling scanning speed in vertical scanning direction according to scale factor in the vertical scanning direction, and a thinning-out means for thinning-out the image data stored in the storage means in every one line unit according to scale factor in the vertical scanning direction.

In accordance with a second aspect of the present invention, in the first aspect, there is provided an image processing apparatus, wherein the control means permits the scanning speed in the vertical scanning direction to be slow down to enlarge the image in the vertical scanning direction, on the other hand, the thinning-out means carries out a thinning-out of the image data enlarged by the control means in every line unit in order to reduce the image in the vertical scanning direction, thus enlarging the image with arbitrary scale factor.

In accordance with a third aspect of the present invention, in the first aspect, there is provided an image processing apparatus, wherein a scanning in the vertical scanning direction is carried out by a stepping motor being operated synchronized with prescribed reference clock, and said control means consists of a frequency demultiplier which divides down the reference clock.

In accordance with a fourth aspect of the present invention, in the first aspect, there is provided an image processing apparatus, wherein the scanning in the vertical scanning direction is carried out by a stepping motor being operated synchronized with prescribed reference clock, and the control means controls the stepping motor by the reference clock in such a way that the stepping motor rotates in every angle of θ/N degrees (N is the M-th power of 2 (two), M is 0 or arbitrary natural number) on the supposition that the angle of θ is an angle which the stepping motor rotates in every one clock of the reference clock.

In accordance with a fifth aspect of the present invention, in the first aspect, there is provided an image processing apparatus, wherein the image processing apparatus further comprises a generation means for generating a signal to specify an effective pixel of the image data corresponding to one line stored in the storage means according to the scale factor in the horizontal scanning direction.

In accordance with a sixth aspect of the present invention, in the first aspect, there is provided an image processing apparatus, wherein the storage means is an FIFO memory which reads-out the image data stored therein in the stored order.

In accordance with a seventh aspect of the present invention, in the first aspect, there is provided an image processing apparatus, wherein the image data is an image data of multi-gradation, and the storage means stores therein the image data of multi-gradation.

In accordance with an eighth aspect of the present invention, there is provided an image processing method which scans a manuscript to read-out an image of the manuscript comprising the steps of, a storage step for storing an image data corresponding to one line in the horizontal scanning direction, a first generation step for generating prescribed reference pulse, a second generation step for generating a thinned-out pulse obtained in such a way that the reference pulse is thinned-out with a prescribed rate, a read-out step for reading-out the image data stored in the storage step according to either the reference pulse or the thinned-out pulse an output step for outputting the image data read-out in the read-out step according to either the reference pulse or the thinned-out pulse a first changeover step for changing reading-out of the image data in the read-out step according to which one between the reference pulse and the thinned-out pulse a second changeover step for changing output of the image data in the output step according to which one between the reference pulse and the thinned-out pulse a control step for controlling scanning speed in vertical scanning direction according to scale factor in the vertical scanning direction, and a thinning-out step for thinning-out the image data stored in the storage means at the storage step in every one line unit according to the scale factor in the vertical scanning direction.

In accordance with a ninth aspect of the present invention, there is provided a storage media for storing therein an image processing method as a program which is capable of being executed the image processing method that an image processing method which scans a manuscript to read-out an image of a manuscript comprising the steps of, a storage step for storing an image data corresponding to one line in the horizontal scanning direction, a first generation step for generating prescribed reference pulse, a second generation step for generating a thinned-out pulse obtained in such a way that the reference pulse is thinned-out with a prescribed rate, a read-out step for reading-out the image data stored in the storage step according to either the reference pulse or the thinned-out pulse, an output step for outputting the image data read-out in the read-out step according to either the reference pulse or the thinned-out pulse, a first changeover step for changing reading-out of the image data in the read-out step according to which one between the reference pulse and the thinned-out pulse, a second changeover step for changing output of the image data in the output step according to which one between the reference pulse and the thinned-out pulse, a control step for controlling scanning speed in vertical scanning direction according to scale factor in the vertical scanning direction, and a thinning-out step for thinning-out the image data stored in the storage means at the storage step in every one line unit according to the scale factor in the vertical scanning direction.

As described above, in the image processing apparatus and the image processing method, and the storage media thereof according to the present invention, the image data corresponding to one line in the horizontal direction is stored in the image processing apparatus, the image processing apparatus generates the prescribed reference pulse and the thinned-out pulse obtained in such a way that the reference pulse is thinned-out with prescribed rate. The stored image data is read-out according to either the reference pulse, then the read-out data is outputted according to either the reference pulse or the thinned-out pulse. The scanning speed in the vertical scanning direction is controlled according to the scale factor in the vertical scanning direction, and the stored image data is thinned-out in every one line unit according to the scale factor in the vertical scanning direction.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

DETAILED DESCRIPTION OF THE PREFERRED EMBODIMENTS

A preferred embodiment of the present invention will be described in detail in accordance with the accompanying drawings.

The present invention is capable of being carried out image enlargement with multi-gradation in the facsimile device and/or the digital copying machine. In the invention, there is provided to be added a line memory for storing therein an image corresponding to one-line of the horizontal scanning direction for the part of the multi-gradation image reduction circuit in the horizontal scanning direction of the scanner (particularly, there is no mechanical mechanism for enlarging and/or reducing in the horizontal direction), a horizontal scanning enable signal generator for controlling the line memory, and a clock changeover section for changing thinned-out pulse which is output of the horizontal scanning thinned-out pulse generator for the sake of reduction into the pulse before reduction. Thus it is capable of being enlarged image in the multi-gradation.

Figure 3:
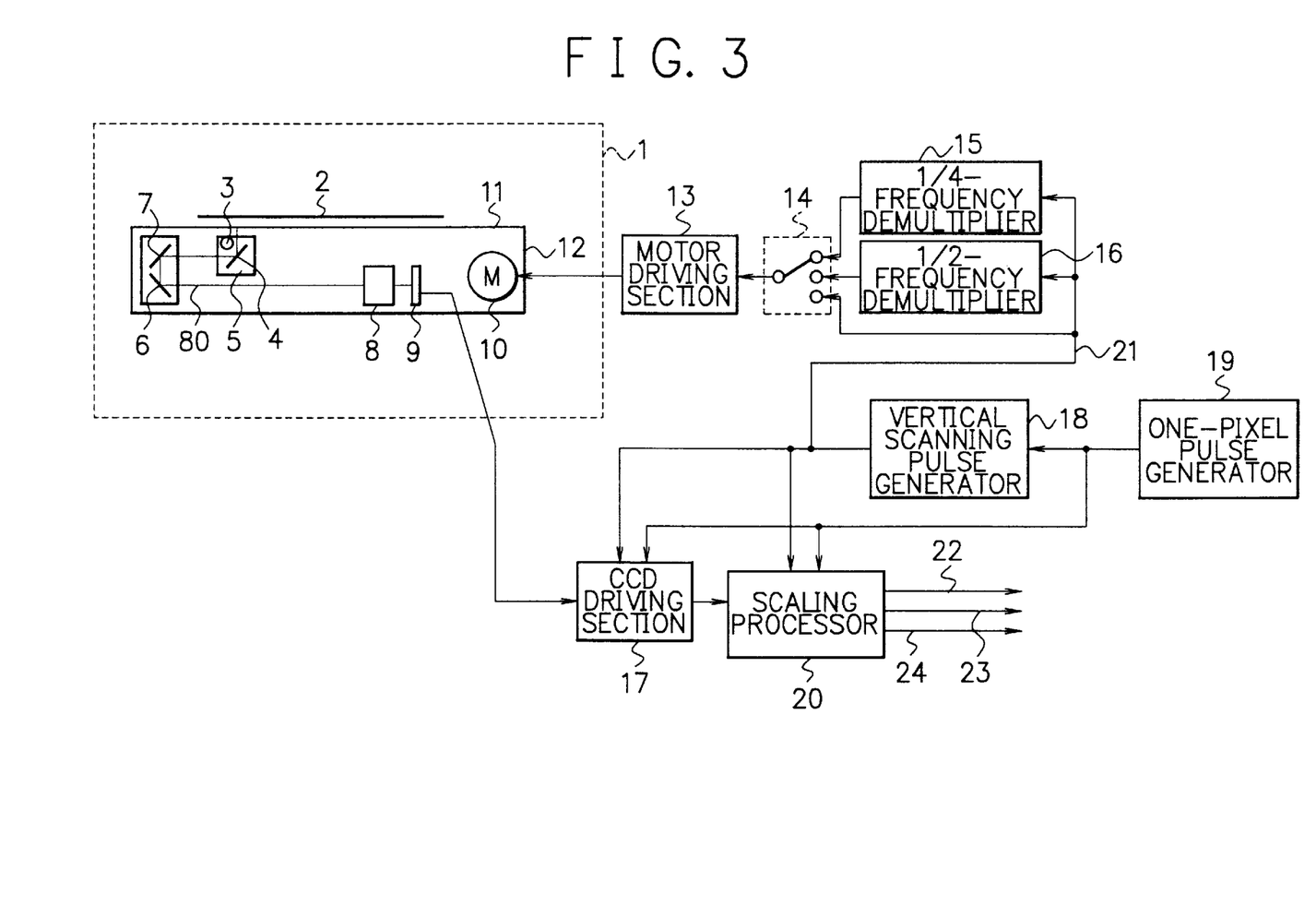
FIG. 3 is a block diagram showing a configuration example of one embodiment of an image processing apparatus of the present invention.
Figure 4:
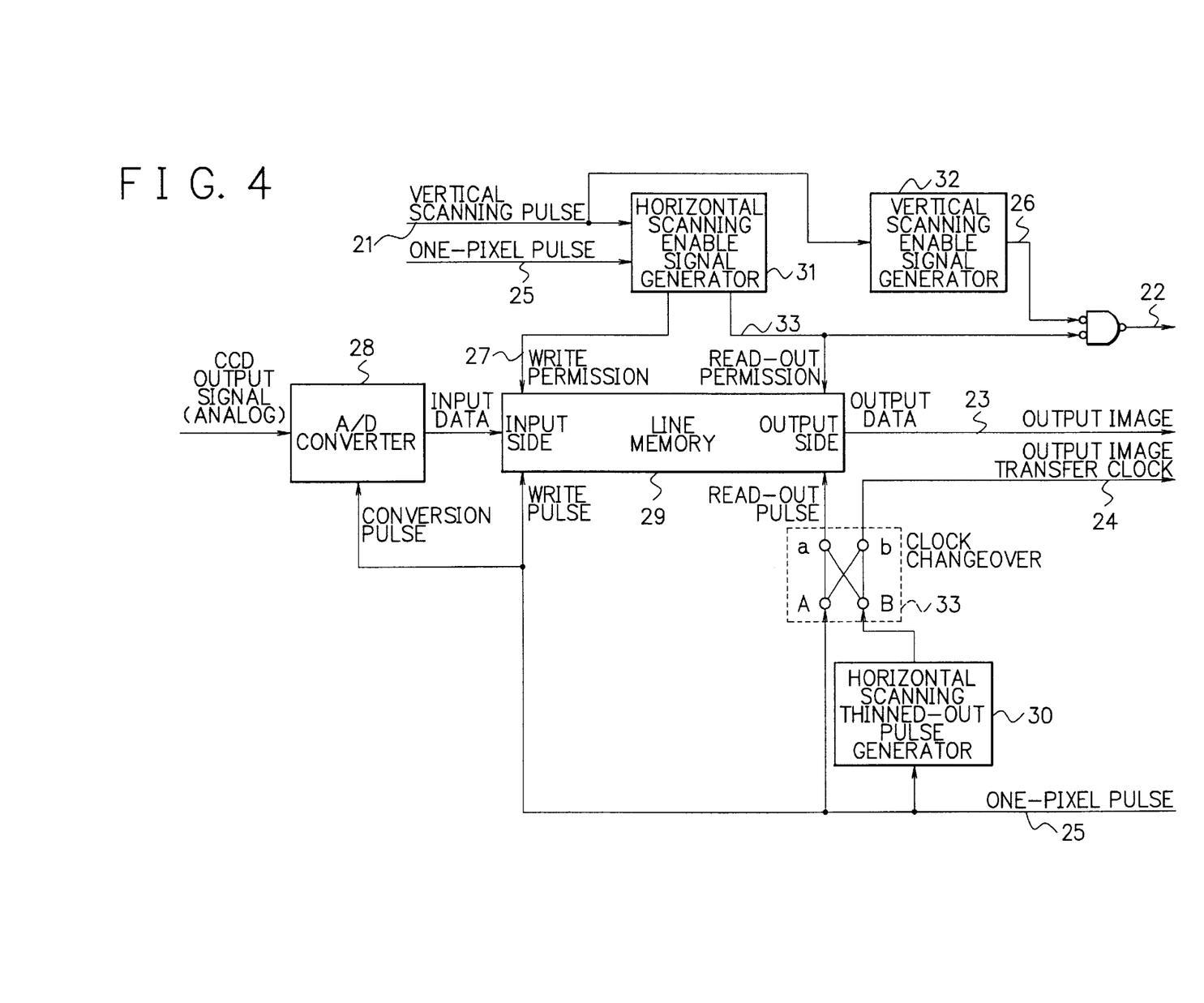
FIG. 4 is a block diagram showing a configuration example of a scaling processor 20 of FIG. 3.

FIG. 3 is a block diagram showing a configuration example of one embodiment of an image processing apparatus of the present invention, and FIG. 4 is a block diagram showing a configuration example of a scaling processor 20 for carrying out enlargement and reduction of the multi-gradation image of the embodiment of FIG. 3. As mentioned-above, according to the conventional multi-gradation image reduction processor shown in FIG. 1, as is clear from the timing chart shown in FIG. 2, The A/D converter 28 converts the image before reduction in every one-pixel into the output image 23 (output image 77 of FIG. 2) consisting of digital value of multi-gradation. The horizontal scanning thinned-out pulse generator 30 thins-out the one-pixel pulse 25. The thinned-out pulse is taken to be the output image transfer clock 24 (thinned-out pulse 78 of FIG. 2) for the next image processing stage (for instance, processor for executing gamma correction and/or binarization). Thereby, it is realized reduction of the image.

On the other hand, in the embodiment of the present invention shown in FIG. 4, there is provided a line memory 29 for storing therein corresponding image for one-line of the horizontal scanning, a horizontal scanning enable signal generator 31 for controlling thereof, and a clock changeover section 81 which can change the pulse outputted from the horizontal scanning thinned-out pulse generator 30 for the sake of reduction with the pulse before reduction.

The line memory 29, when a write permission signal 27 from the horizontal scanning enable signal generator 31 is effective, input data is written by write-pulse, while when the horizontal scanning enable signal (read-out permission signal) 33 is effective, the data is read-out in written order by read-out pulse. This is FIFO memory.

The write is carried out in every one-pixel unit before reduction or before enlargement regarding the line memory 29. At the time of reduction, the image data is read-out in every one-pixel unit. As shown in the timing chart of FIG. 5, the output (output image transfer clock 40 of FIG. 5) of the horizontal scanning thinned-out pulse generator 30 is given to the output image transfer clock 24. Accordingly, an output image transfer clock frequency is less than a read-out frequency, reduction in arbitrary scale factor is carried out, as being similar to the case of the prior art.

Figure 6:
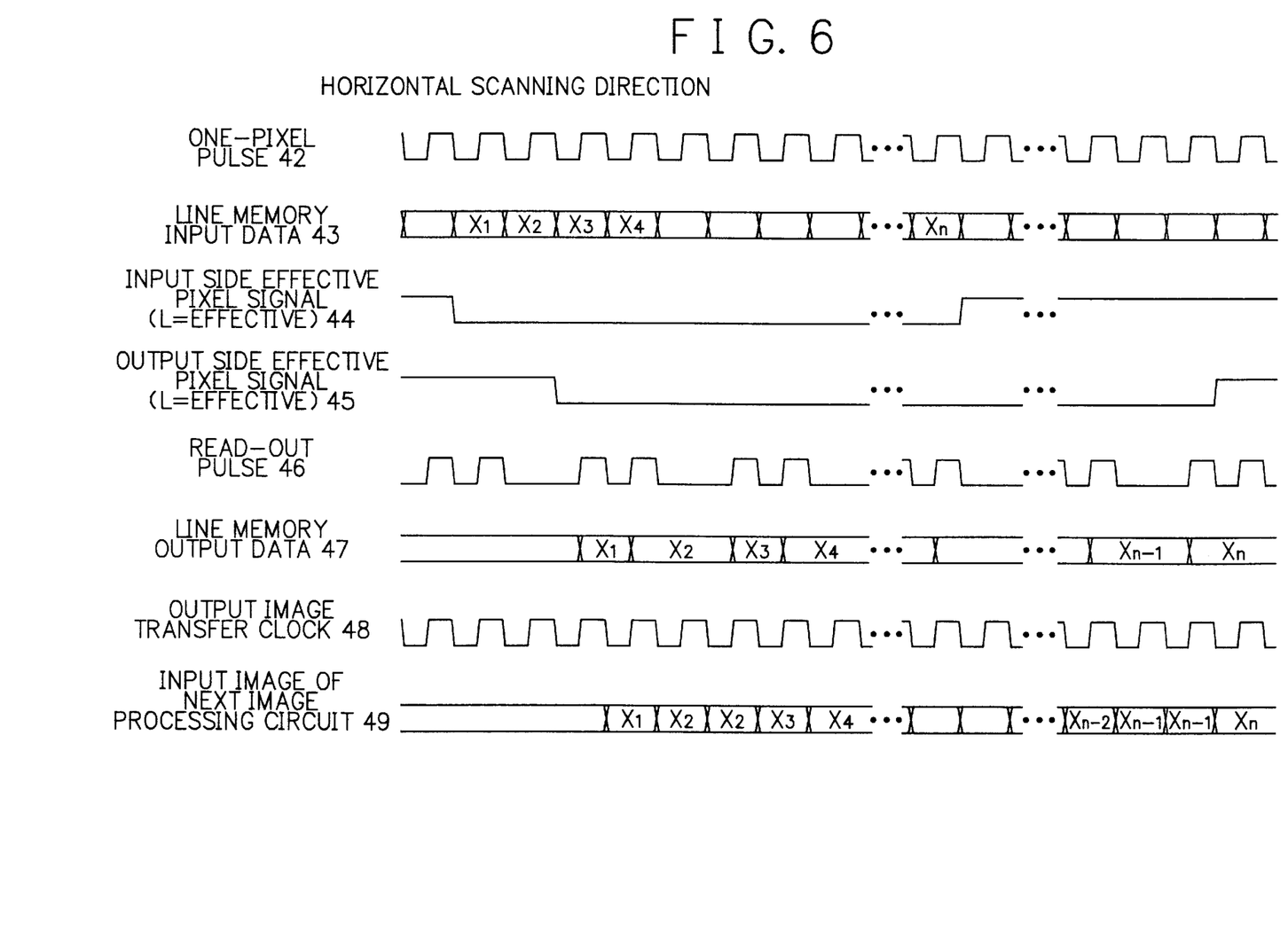
FIG. 6 is a timing chart showing operation at the time of enlargement in the horizontal scanning direction of the embodiment of both FIG. 3 and FIG. 4.

On the other hand, as shown in the timing chart of FIG. 6, at the time of enlargement, the output pulse (read-out pulse 46 of FIG. 6) of the horizontal scanning thinned-out pulse generator 30 is used as the read-out pulse. The one-pixel pulse 25 (output image transfer clock 48 of FIG. 6) is used as the output image transfer clock. Accordingly, an output image transfer clock frequency is more than the read-out frequency. Consequently, effect is obtained of enlargement in the arbitrary scale factor in the horizontal scanning direction.

Further, with respect to the vertical scanning direction, a vertical scanning 1/4-frequency demultiplier 15, and a vertical scanning 1/2-frequency demultiplier 16 in order to decrease scanning speed in the vertical scanning direction are added to the front stage of the motor driving section 13. Thus resolution is improved in the vertical scanning direction of the image data inputted to the scaling processor 20.

Namely, there are provided the vertical scanning 1/4-frequency demultiplier 15 and the vertical scanning 1/2-frequency demultiplier 16 at the front stage of the motor driving section 13 so that it is capable of being selected the pulse for giving to the motor driving section 13 from three kinds of the vertical scanning pulses of the vertical scanning pulse which is not divided down, the vertical scanning pulse which is divided down into 1/2-frequency, and the vertical scanning pulse which is divided down into 1/4-frequency.

Figure 7:
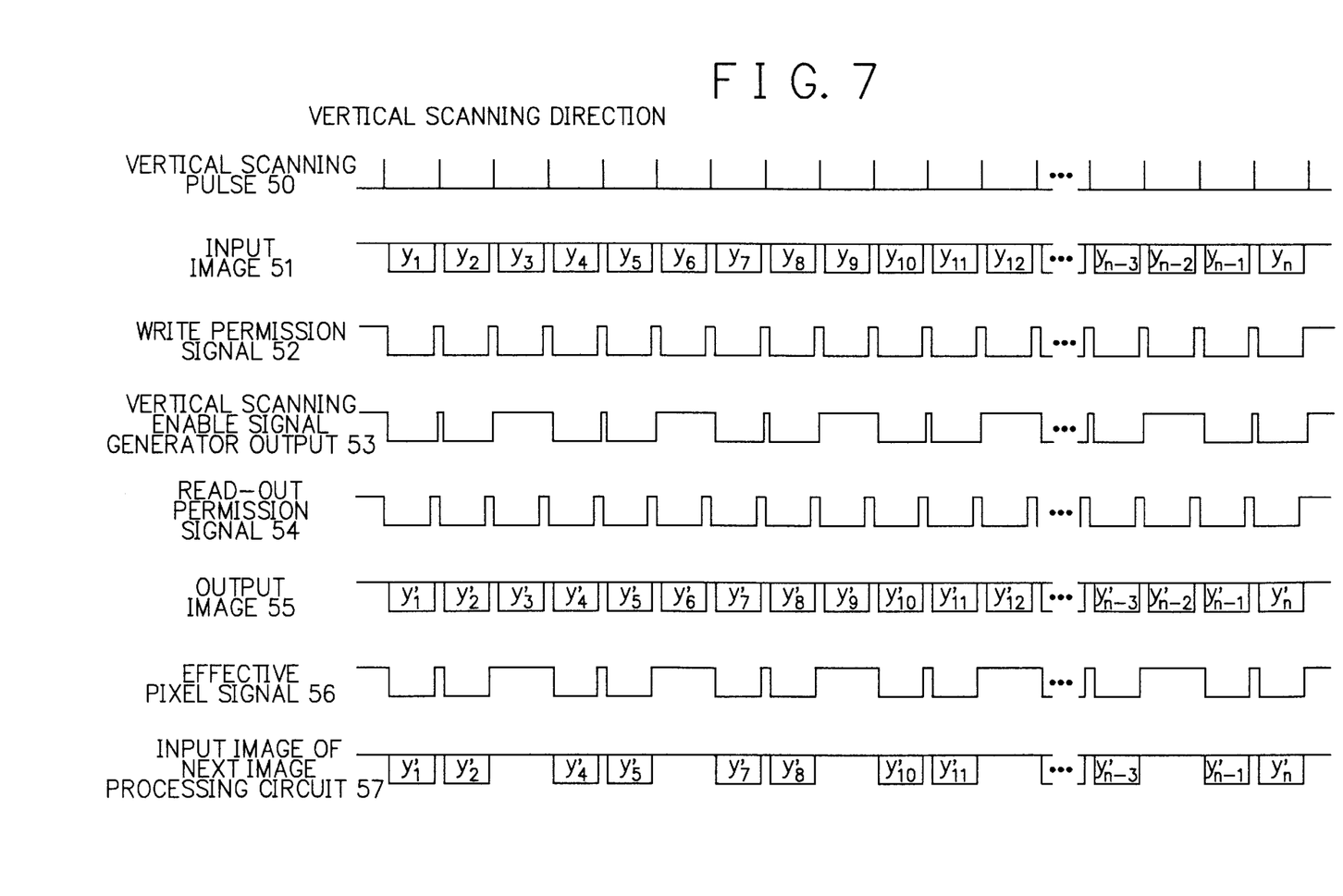
FIG. 7 is a timing chart showing operation at the time of reduction in the vertical scanning direction of the embodiment of both FIG. 3 and FIG. 4.

Formerly, at the time of reduction operation, as shown in the timing chart of FIG. 7, the vertical scanning pulse 21 which is not divided down is given to the motor driving section 13, thus reduction is realized with arbitrary scale factor in the vertical direction due to thinning-out effective pixel signal 22.

On the other hand, in the present invention, at the time of enlargement, the image inputted to the scaling processor 20 is enlarged in double or four times in the vertical direction in such a way that the pulse which is given to the motor driving section 13 in the vertical scanning direction is divided down into 1/2-frequency or 1/4-frequency. Next, reduction is carried out with arbitrary scale factor in the vertical scanning direction similar to the conventional case concerning the picture which is enlarged in the vertical scanning direction. It is capable of being obtained the effect of enlargement for the arbitrary scale factor.

For instance, the clock given to the motor driving section 13 is divided down into 1/2-frequency, before it is reduced into 75% using conventional reducing technique in the vertical scanning direction, with the result that 150% (=2× 0.75×100) enlarged image in the vertical scanning direction is obtained, thus to be inputted to the next image processing stage.

Next, detailed description will be provided about the configuration example of the embodiment and operation thereof according to the present invention in accordance with the drawings.

FIG. 3 is a view showing a configuration example of one embodiment of the image processing apparatus of the present invention. As shown in FIG. 3, there is provided a manuscript stand 11 made of glass and so forth at the upper part of a scanner mechanism 1. A manuscript 2 which becomes a read-out candidate is set on the manuscript stand 11. A light source lamp 3 on a carriage 5 radiates light for the manuscript 2. The light is reflected by surface of the manuscript 2. The reflected light is led to a photoelectric conversion element (hereinafter referring to CCD (charge coupled device)) 9 through three mirrors 4, 7, and 6 and a lens 8 whose focal length is fixed.

The carriage 5 includes the light source lamp 3 and the mirror 4. The carriage 5 can move in the direction of right and left (vertical scanning direction) in FIG. 3 by the motor 10. Further, the mirror 6 and the mirror 7 also move in the direction of right and left (vertical scanning 15 direction) in FIG. 3 by the motor 10 similar to the case of the carriage 5. The mirror 6 and the mirror 7 move simultaneously with the carriage 5 in the same direction. The speed of the mirror 6 and the mirror 7 is half of the speed of the carriage 5. For that reason, even though the carriage 5 moves, optical path length 80 from the surface of the manuscript to the lens 8 becomes fix.

The lens 8 has a fixed focus. The lens 8 fixed to a frame 12 of the scanner mechanism. The image of the manuscript 2 is focused on the photoelectric conversion element 9.

The photoelectric conversion element 9 which consists of, for instance, CCD type line image sensor and so forth has a function for converting the reflected light from the manuscript 2 into electric signal.

A one-pixel pulse generator 19 generates a pulse in every one-pixel which becomes reference of operation when the present device carries out image read-out operation. A vertical scanning pulse generator 18 generates one pulse (vertical scanning pulse) in every one line which denotes reference of operation of vertical scanning direction and an operation start in every one line of horizontal scanning direction.

The 1/4-frequency demultiplier 15 outputs a pulse signal which the vertical scanning pulse is divided down into 1/4-frequency in order to make the scanning speed in the vertical scanning direction one-fourth. The 1/2-frequency demultiplier 16 outputs a pulse signal which the vertical scanning pulse is divided down into 1/2-frequency in order to make the scanning speed in the vertical scanning direction one-half.

A vertical scanning speed selector 14 selects the pulse as the pulse given to the motor driving section 13 according to the instruction from a main controller (CPU and so forth) which is not illustrated. In the case of read-out of the same scale or the reduction, the vertical scanning speed selector 14 selects the vertical scanning pulse which is not divided down. In the case of enlargement exceeding 100% until 200%, the vertical scanning speed selector selects the pulse that the vertical scanning pulse is divided down into 1/2-frequency. In the case of enlargement exceeding 200% until 400%, the vertical scanning speed selector selects the pulse that the vertical scanning pulse is divided down into 1/4-frequency.

The motor driving section 13 causes the motor to be rotated with the velocity in proportion to the frequency of the inputted pulse (more concretely, the velocity that the mirror 5 moves distance corresponding to one line of the vertical scanning in every one pulse), thus causing the carriage 5, and the mirrors 6, 7 to move in the vertical scanning direction.

The photoelectric conversion element 9 which is driven by the CCD driver 17 supplies the image signal in every one-pixel unit to the scaling processor 20.

The scaling processor 20 outputs the output image 23 of the multi-gradation. Also the scaling processor 20 outputs the output image transfer clock 24 as the clock for transferring the image and the effective pixel signal 22 for representing whether the outputted pixel is the effective pixel. It becomes possible to carry out the next image processing (gamma correction and binarization processing) due to these signals.

Next, the configuration and operation of the scaling processor 20 will be described in detail referring to FIG. 4. The A/D converter 28 operates due to the one-pixel pulse 25. The A/D converter 28 converts an input pixel of the analog signal into a digital data of the multi-gradation in every one-pixel unit.

The line memory 29 consists of, for instance, memory of FIFO type. When the write pulse is inputted with the condition that write permission signal 27 from the horizontal scanning enable signal generator 31 is effective, the line memory 29 stores therein the data inputted through the A/D converter 28. Further, the read-out pulse is inputted with the condition that the read-out permission signal 33 is effective, the line memory 29 outputs data stored previously in order of storage-order.

The horizontal scanning thinned-out pulse generator 30 outputs a thinned-out pulse which is obtained in such a way that the one-pixel pulse is thinned-out in the specified ratio according to the instruction of the main controller (CPU and so forth) which is not illustrated.

The clock changeover section 81 carries out the change between the above-mentioned thinned-out pulse and the one-pixel pulse 25 to supply as the read-out pulse of the line memory 29. The clock changeover section 81 also carries out the change between the thinned-out pulse and the one-pixel pulse 25 to output as the output image transfer clock 24. For instance, at the time of reduction, the one-pixel pulse is supplied to the line memory 29 as the read-out pulse, the thinned-out pulse is given as the output image transfer clock 24. At this time, connection of the changeover section 81 of FIG. 4 becomes A-a, B-b.

Further, at the time of the same scale, the one-pixel pulse 25 is given both to the read-out pulse of the line memory 29 and the output image transfer clock 24. At this time, the connection of the clock changeover section 81 of FIG. 4 becomes A-a, A-b. Furthermore, at the time of enlargement, the thinned-out pulse is given from the horizontal scanning thinned-out pulse generator as the read-out pulse for the line memory 29, and the one-pixel pulse 25 is given as the output image transfer clock 24. At this time, the connection of the clock changeover section 81 of FIG. 4 becomes A-b, B-a.

The horizontal scanning enable signal generator 31 generates the write permission signal 27 and the read-out permission signal 33 for the line memory 29 from the vertical scanning pulse 21 and the one-pixel pulse 25.

The write permission signal 27 (input side effective pixel signal 36 of FIG. 5) becomes effective over the interval as being full of effective read-out width of the CCD 9 at the time of reduction and I or at the time of same scale. At the time of enlargement, the signal (input side effective pixel signal 44 of FIG. 6) is outputted. The signal becomes effective only over the necessary image range after enlargement, while the signal becomes invalid over the range which becomes unnecessary after enlargement. Further, the read-out permission signal 33 of the output side (output side effective pixel signal 45 of FIG. 6) is outputted with a little time delay (time corresponding to some pixels in transfer clock) after starting to be outputted the write permission signal 27. Because it is necessary to wait for the time when the pixel written from the input side can be read-out surely, and immediately starting the read-out of the image of the line.

Due to these operations, the write position of next line does not approach the read-out position within the line memory 29, thus it is capable of being settled only one-line of the line memory 29.

The output signal of the scaling processor 20 is connected to the circuit carrying out next general image processing (for instance, edge emphasis, gamma correction, binarization and so forth). Further, in the case of transmission by the facsimile device, the output signal of the scaling processor 20 is connected to the encoding processing, or in the case of the digital copy machine, the output signal of the scaling processor 20 is connected to the PPC printer. However, about general image processing, encoding processing, and PPC printer, these are well known in the art, therefore, description about configuration is omitted.

Figure 5:
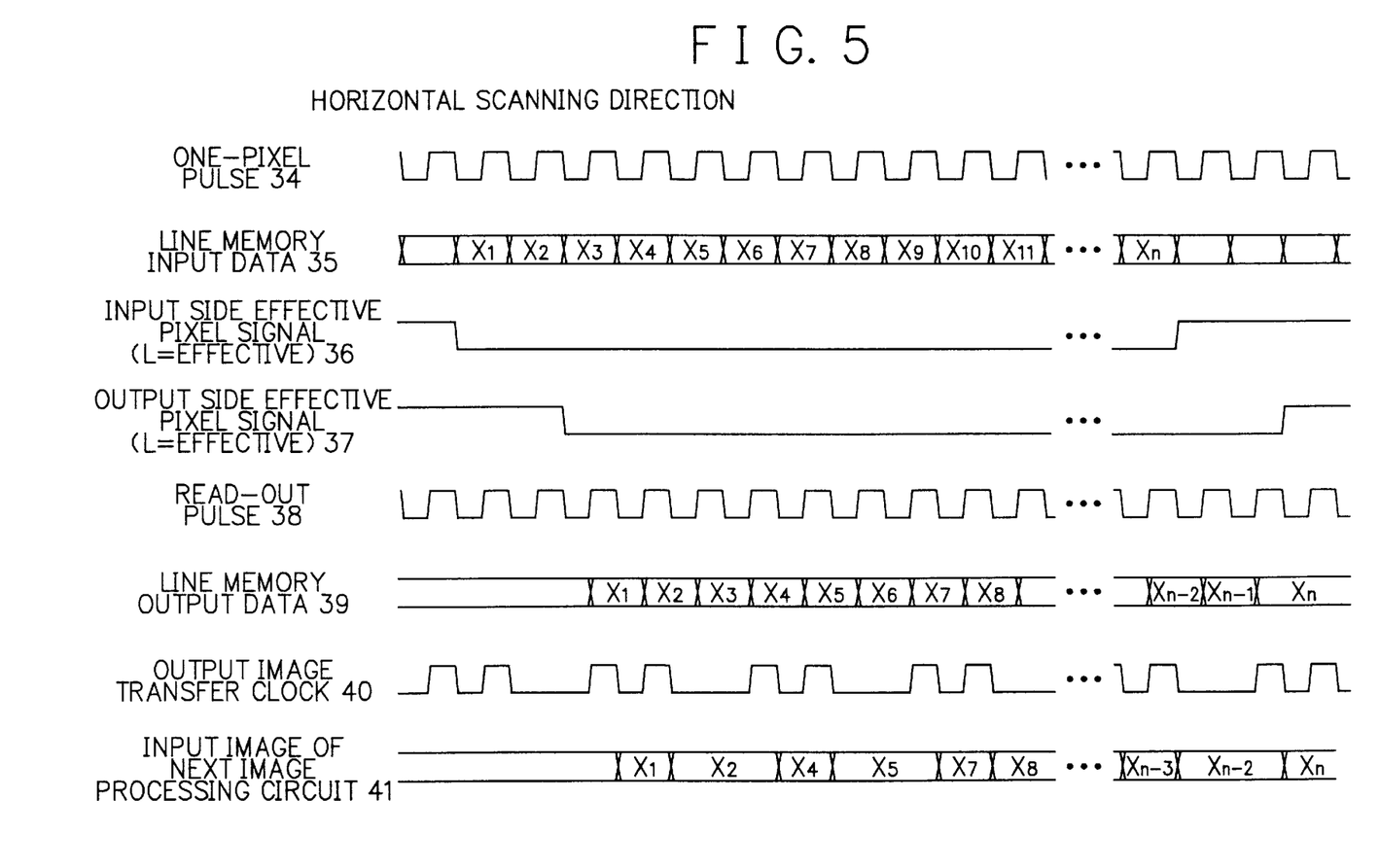
FIG. 5 is a timing chart showing operation at the time of reduction in the horizontal scanning direction of the embodiment of both FIG. 3 and FIG. 4.

Next, operation will be described concerning the embodiment of the above-mentioned configuration. Firstly, operation of enlargement and reduction will be described in the horizontal scanning direction in accordance with the timing chart shown in FIGS. 5 and 6. FIG. 5 shows operation of the case of reducing the image into 66%. At the time of reduction, the connection of the clock changeover section 81 of FIG. 4 is set to as being A-a, B-b.

The inputted image data is converted into the multi-gradation digital data in every one-pixel of the photoelectric conversion element 9 by the A/D converter 28 constituting the scaling processor 20 of FIG. 3. The digital data becomes the input data (line memory input data 35 of FIG. 5) of the line memory 29. While the write permission signal 27 (input side effective pixel signal 36 of FIG. 5) indicating effective read-out region is effective (in FIG. 5, low level (L) is taken to be effective), writing the whole pixels into the line memory 29.

On the other hand, the read-out permission signal 33 is outputted with a little time delay (in FIG. 5, time delay corresponds to two pixels) with respect to the write permission signal 27 (input side effective pixel signal 36 of FIG. 5). When the read-out permission signal 33 (output side effective pixel signal 37 of FIG. 5) becomes effective, the data on the line memory 29 is read-out in every one-pixel in the written-order by the one-pixel pulse 25 which is the read-out pulse 38.

The output image transfer clock 24 for the next image processing stage becomes the pulse 40 (output image transfer clock of FIG. 5) thinned-out by the horizontal scanning thinned-out pulse generator 30. In the next image processing stage, the image data 39 (line memory output data of FIG. 5) is received synchronized with the pulse 40. For that reason, the input image which the next image processing stage receives becomes an input image like the input image 41 of the next image processing apparatus of FIG. 5. Namely, the read-out pulse 38 has high pulse density than the output image transfer clock 40 so that the image is reduced.

At the time of the same scaling operation in the horizontal scanning direction, the connection of the clock changeover section 81 of FIG. 4 becomes A-a, A-b. Over the operation of this time point, the output image transfer clock 40 shown in the timing chart of FIG. 5 becomes the same pulse as the read-out pulse 38, so that the whole pixels outputted from the line memory 29 are transferred for the next image processing stage. As the result, the image is not reduced or enlarged at all.

The enlargement operation in the horizontal scanning direction is carried out in accordance with the timing chart shown in FIG. 6. FIG. 6 is a timing chart showing the case where the image is enlarged into the image of 150%. At the time of enlargement operation, the connection of the clock changeover section 81 of FIG. 4 is made A-b, B-a.

The inputted image data is converted into the digital data with multi-gradation in every one-pixel of the CCD 9 by the A/D converter 28 of the scaling processor 20. The digital data with multi-gradation becomes the input data 43 (FIG. 6) of the line memory 29. While the write permission signal 27 (input side effective pixel signal 44 of FIG. 6) which becomes effective only necessary image range after enlargement is effective (effective over L in FIG. 6), causing the whole pixels to be written into the line memory 29. However, the write permission signal 44, as shown in FIG. 6, has short effective period than the read-out permission signal 33 (output side effective pixel signal 45 of FIG. 6). It might be difficult to understand in FIG. 6. Concretely, effective period of the input side effective pixel signal 44 becomes only necessary range of the image after enlargement, here, since it is enlargement of 150%, the effective period becomes 100/150 of the output side effective pixel signal 45, namely, becomes only 2/3 period of the pixel signal 45.

Further, when the output side effective pixel signal 45 which is outputted with a little delay time (corresponding to two-pixel in FIG. 5) regarding the input side effective pixel signal 44 becomes effective, the data on the line memory 29 is read-out in every one-pixel in the written order under the timing that level of the pulse (read-out pulse) 46 becomes high-level (H). The pulse 46 is the pulse which the one-pixel pulse is thinned-out by the horizontal scanning thinned-out pulse generator 30. For that reason, a line memory output data 47 is outputted under the timing as shown in FIG. 6.

The output image transfer clock 24 (output image transfer clock 48 of FIG. 6) for the next image processing stage is the same pulse as the one-pixel pulse 25. The image data (line memory output data 47 of FIG. 6) is received synchronized with the pulse 48 in the next image processing circuit. For that reason, the input image becomes as being the input image 49 of the next image processing circuit shown in FIG. 6. As the result, since the read-out pulse has low pulse density than the output image transfer clock 48, the image is enlarged.

Next, operation of enlargement and reduction in the vertical scanning direction will be described in accordance with the timing chart of FIGS. 7 and 8.

Figure 8:
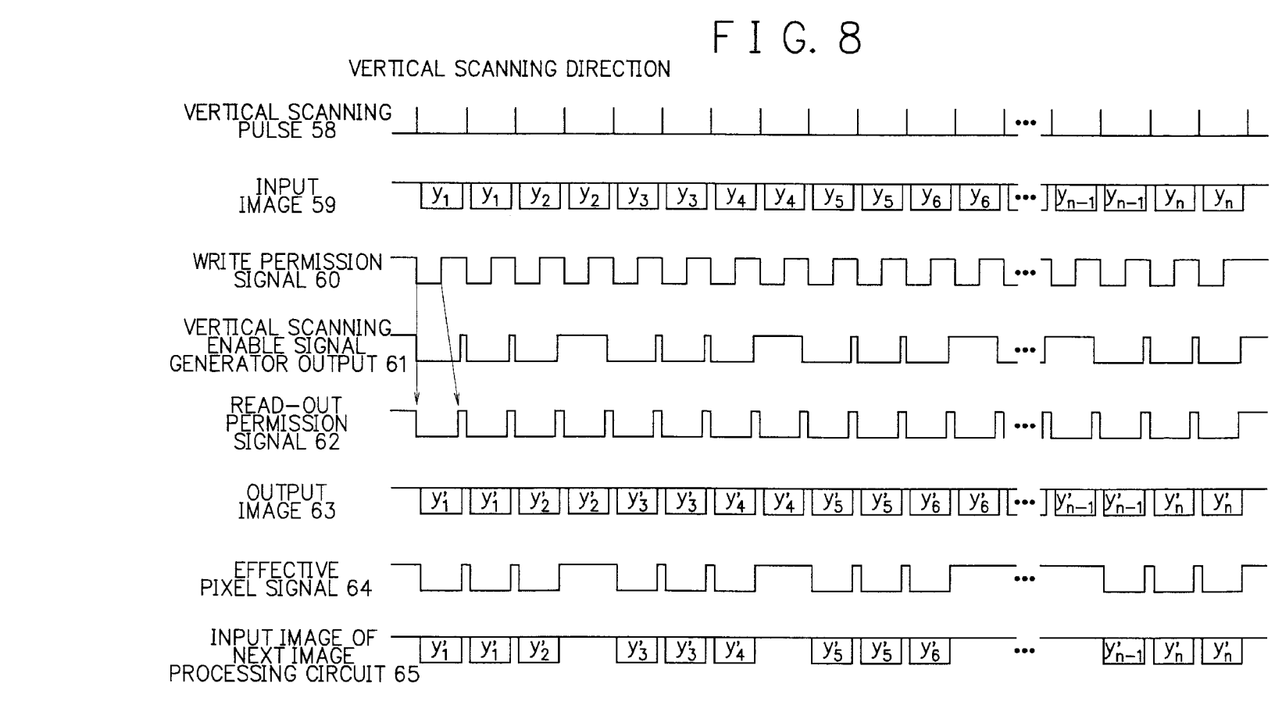
FIG. 8 is a timing chart showing operation at the time of enlargement in the vertical scanning direction of the embodiment of both FIG. 3 and FIG. 4.

In FIGS. 7 and 8, the write permission signal 27 (write permission signal 52 of FIG. 7, write permission signal 60 of FIG. 8), the output signal of the vertical scanning enable signal generator 32 (vertical scanning enable signal generator output 53 of FIG. 7, vertical scanning enable signal generator output 61 of FIG. 8), the read-out permission signal 54 of FIG. 7, the read-out permission signal 62 of FIG. 8, the effective pixel signal 56 of FIG. 7, and the effective pixel signal 64 of FIG. 8 are described with low level (L) as effective. Since the one-pixel pulse 24 becomes very small, it is not described in FIGS. 7 and 8.

Firstly, operation of the case where the image is reduced into 66% thereof will be described referring to FIG. 7. In this case, the pulse given to the motor driving section 13 becomes the vertical scanning pulse 21 itself so that read-out speed of the optical system is the same as at the time of the same scaling. Consequently, the next vertical scanning line (input image 51 of FIG. 7) is inputted to the A/D converter 28 of FIG. 4 in every case where the vertical scanning pulse 21 (vertical scanning pulse 50 of FIG. 7) is generated once. The relationship between the vertical scanning pulse 50 and the input image 51 becomes as being FIG. 7.

Here, y1, y2, y3, . . . , yn of the input image 51 within the timing chart of FIG. 7 represents the image data (y1) in the first line, the image data (y2) in the second line, the image data (y3) in the third line, . . . , the image data (yn) in the n-th line respectively. The input image is written into the line memory once synchronizing with the write permission signal 27 (write permission signal 52 of FIG. 7) which the horizontal scanning enable signal generator 31 generates and the one-pixel pulse 25. The input image is read-out from the line memory 29 synchronized with the read-out permission signal 33 (read-out permission signal 54 of FIG. 7) and the one-pixel pulse 25 with a little time delay (corresponding to two-pixels in the description of previous horizontal scanning). At this time, the enlargement or the reduction in the horizontal scanning direction mentioned previously is carried out. In FIG. 7, it is taken to be the timing chart of the case of the same scale or the reduction.

Further, y'1, y'2, y'3, . . . , y'n within the timing chart of the output image 55 represents the image data after the same scale or after the reduction in the horizontal scanning direction of the image data in the first line, the image data in the second line, the image data in the third line, . . . , the image data in the n-th line at the time of read-out respectively. If the image is the same scale, relationship becomes as being y'k=yk (k is any one of 1 to n).

The vertical scanning enable signal generator 32 generates the signal indicating whether the data outputted from the line memory 29 is effective according to the reduction factor. Since the timing chart shown in FIG. 7 indicates the case of 66% reduction, it is suitable that one line is thinned-out in every three lines. The signal outputted from the vertical scanning enable signal generator 32 becomes the vertical scanning enable signal generator output 53 shown in FIG. 7.

When signals are effective between the signal 53 (vertical scanning enable signal generator output) and the read-out permission signal 33 (read-out permission signal 54 of FIG. 7), the effective pixel signal 22 is outputted for indicating that the output image is effective. In the case of 66% reduction, the effective pixel signal 56 is outputted as shown in FIG. 7.

In the next stage of the image processing circuit (circuit executing gamma correction, binarization and so forth), while the effective pixel signal is effective, the output image is inputted synchronized with the output image transfer clock 24 which is not illustrated in FIG. 7. The image signal becomes the input image 57 for the next image processing circuit as shown in FIG. 7, thus the reduction in the vertical scanning direction becomes possible to be carried out while carrying out thinning-out operation.

On the other hand, in the same scale operation of the vertical scanning direction, the signal (vertical scanning enable signal generator output 53 of FIG. 7) is not made thinned-out, with respect to the signal which indicates whether the data outputted from the line memory 29 is effective, and which signal the vertical scanning enable signal generator 32 generates in the reduction operation mentioned-above. For that reason, since the whole vertical scanning lines are transmitted for the next stage of the image processing circuit, the reduction in the vertical scanning direction is not carried out.

Next, enlargement operation in the vertical scanning direction will be described referring to the timing chart of FIG. 8. FIG. 8 is a timing chart showing operation of the case causing the image to be enlarged into 150% thereof.

At the time of 150% enlargement, a pulse is obtained in such a way that the vertical scanning pulse 21 (vertical scanning pulse 58 of FIG. 8) outputted from the vertical scanning pulse generator 18 which the vertical scanning pulse 21 is subjected to the 1/2-frequency demultiplier 16. This pulse is given to the motor driving section 13 of FIG. 3 so that it causes the line in the vertical scanning direction to be read-out with two times each in order to supply it for the scaling processor 20. For that reason, the timing between the vertical scanning pulse 58 and the input image 59 becomes as shown in FIG. 8. Here, y1, y2, y3, . . . , yn within the timing chart of the input image 59 represents the image data in the first line, the image data of the second line, the image data of the third line, . . . , the image data in the n-th line respectively.

At the time of enlargement shown in FIG. 8 different from the case of reduction shown in FIG. 7, the same data appears two times each such as y1, y1, y2, y2, y3, y3, . . . , yn, yn as the input image 59. Because, the pulse which is given to the motor driving section 13 is divided down into 1/2-frequency, thus the same position is read-out with two times each, whereby it is enlarged by 200% in the vertical scanning direction.

The input image is written into the line memory 29 once synchronizing with the write permission signal 27 (write permission signal 60 of FIG. 8) which the horizontal scanning enable signal generator 31 generates and the one-pixel pulse 25. The input image is read-out from the line memory 29 synchronized with the read-out permission signal 33 (read-out permission signal 62 of FIG. 8) and the one-pixel pulse 25 with a little time delay (corresponding to two-pixels in the description of previous horizontal scanning). At this time, the enlargement or the reduction in the horizontal scanning direction mentioned previously is carried out. In FIG. 8, it is taken to be the timing chart of the case of the enlargement.

Further, y'1, y'2, y'3, ..., y'n within the timing chart of the output image 63 represents the image data after the enlargement or after the reduction in the horizontal scanning direction of the image data in the first line, the image data after the enlargement or after the reduction in the horizontal scanning direction of the image data in the second line, the image data after the enlargement or after the reduction in the horizontal scanning direction of the image data in the third line, ..., the image data after the enlargement or after the reduction in the horizontal scanning direction of the image data in the n-th line at the time of read-out respectively. If the image is the same scale, relationship becomes as being y'k=yk (k is any one of 1 to n).

The vertical scanning enable signal generator 32 generates the signal (vertical scanning enable signal generator output 61) indicating whether the data outputted from the line memory 29 according to the reduction factor is effective. In the case, as mentioned above, since 200% enlargement in the vertical direction at the time of read-out, here it is proper that 75% reduction in the vertical direction is carried out. Consequently, since it is suitable that one line in every four lines is thinned-out, this signal becomes the vertical scanning enable signal generator output 61 shown in FIG. 8. When the signals are effective between the vertical scanning enable generator output 61 and the read-out permission signal 33, the effective pixel signal 22 indicating that the output image is effective is outputted. In the case of 75% reduction, it becomes as being the effective pixel signal 64 of FIG. 8.

In the next stage of the image processing circuit (circuit for carrying out gamma correction, binarization and so forth), while the effective pixel signal 64 is effective, the output image 63 is inputted synchronized with the output image transfer clock 24 which is not illustrated in FIG. 8, thus becoming as being the input image 65 of the next image processing circuit. As a result, 150% enlargement in the vertical scanning direction becomes possible to carry out all together.

Similarly, in the case of 320% enlargement, a pulse is obtained in such a way that the vertical scanning pulse 21 is subjected to the 1/4-frequency divider 16 resulting in 1/4-frequency divided. This pulse is given to the motor driving section 13 of FIG. 3. For that reason, it is capable of being read-out the line of the vertical scanning direction with four times each to supply it to the scaling processor 20. Thus, the input image of the scaling processor 20 becomes the image with 400% enlargement in the vertical scanning direction due to reading-out the same place in every four times each. Further, it is desirable that 80% reduction in the vertical scanning direction is carried out in the vertical scanning enable signal generator 32. If one line in every five lines is thinned-out, as a result, it is capable of being carried out 320% enlargement in the vertical scanning direction.

Practically, the output signal of the scaling processor 20 is connected to the circuit carrying out next general image processing (for instance, edge emphasis, gamma correction, binarization and so forth). Further, in the case of transmission by the facsimile device, the output signal of the scaling processor 20 is connected to the encoding processing, or in the case of the digital copy machine, the output signal of the scaling processor 20 is connected to the PPC printer. However, about general image processing, encoding processing, and PPC printer, these are well known in the art, therefore, description about configuration is omitted.

As mentioned above, in the horizontal scanning direction, it causes the image with multi-gradation as it is to be stored once in the line memory 29 which operates like the FIFO memory. The read-out operation from the line memory is controlled by the thinned-out pulse. Simultaneously, the one-pixel pulse 25 before thinned-out is used as the image transfer clock 24, thus the enlargement in the horizontal scanning direction is capable of being realized with multi-gradation as it is without increasing frequency of the image transfer clock 24 for the next stage.

Furthermore, in the above mentioned embodiment, the width of the write permission signal 27 of the line memory 29 becomes effective in only the necessary image range after enlargement, while over the range which becomes unnecessary after enlargement, the width of the write permission signal 27 of the line memory 29 becomes ineffective. In addition thereto, the read-out permission signal 33 is outputted with a little time delay (time corresponding to some pixels in transfer clock) from the start of outputting the write permission signal 27 without relation to the vertical scanning pulse 21. According to that reason, the read-out of the image of the line is started immediately after the pixel written from the input side is capable of being read-out surely, thus the write position of the next line does not approach the read-out position within the line memory 29. Consequently, consumption of the line memory 29 is capable of being settled by only one line, so that the scale of the circuit is capable of reduced.

Furthermore, since the enlargement image is obtained with distance from the manuscript surface of the manuscript 2 until the lens 8 is fixed without moving the zoom lens, there is the effect that the mechanism becomes simple.

Moreover, in the prior art, with respect to the vertical scanning direction, the reduction is realized by thinning-out the vertical scanning enable signal according to the reduction factor at the vertical scanning enable signal generator 32. To the contrary, in the embodiment described above, for instance, at the time of enlargement, the vertical scanning pulse added to the motor driving section 13 is subjected to the 1/2-frequency demultiplication or the 1/4-frequency demultiplication, so that it causes the movement speed of the carriage 5 in the vertical scanning direction to be 1/2 or 1/4 thereof. Thus it causes the image data supplied to the scaling processor 20 to be enlarged into two times or four times, subsequently, in the scaling processor 20, required enlargement factor is obtained due to the fact that it makes the enlargement image reduced to appropriate scaling factor by thinning-out of the vertical scanning enable signal 26. As mentioned above, there is the effect that it is capable of being obtained the enlargement image with addition of a few circuits.

Furthermore, since it is unnecessary to render the scanning speed of the vertical scanning direction continuously variable, there has the effect that it becomes easy to suppress the influence of the vibration generated from the stepping motor to the read-out image.

Figure 9:
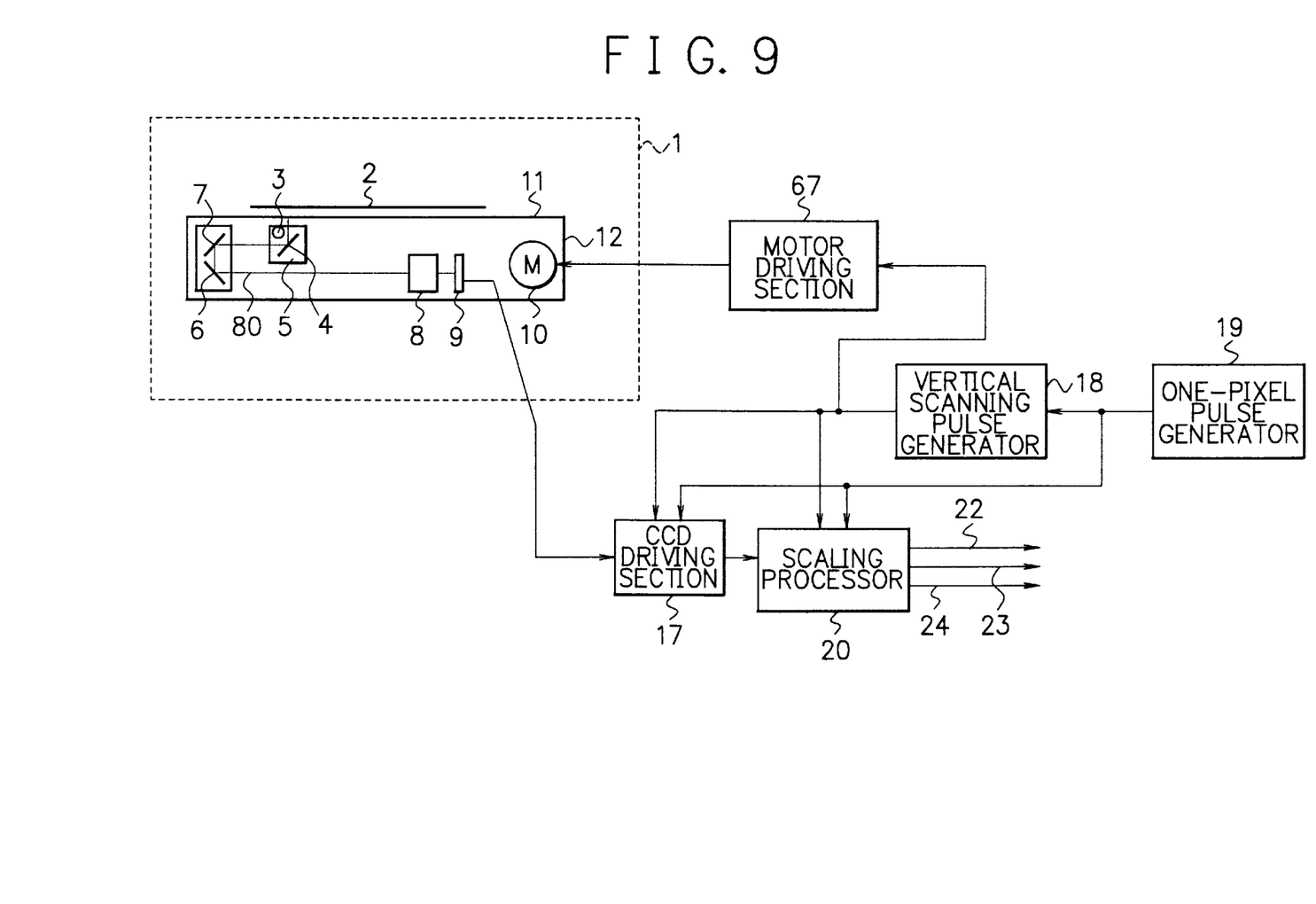
FIG. 9 is a block diagram showing a configuration example of the another embodiment of the image processing apparatus of the present invention.

FIG. 9 is view showing a configuration example of another embodiment of an image processing apparatus of the present invention. In the embodiment shown in FIG. 9, the basic configuration thereof is the same as that of the embodiment shown in FIG. 3. However, enlarging method in the vertical scanning direction is further schemed.

Namely, in FIG. 9, the 1/4-frequency demultiplier 15 which divides down the vertical scanning pulse 21 into 1/4-frequency, the 1/2-frequency demultiplier 16 which divides down the vertical scanning pulse 21 into 1/2-frequency and the motor driving section 13 of FIG. 3 are replaced with another motor driving section 67. The motor driving section 67 is capable of selecting one-to-two phase excitation which enables the stepping motor to rotate with two-phase and/or half step angle of the two-phase, furthermore, the motor driving section 67 is capable of selecting operation with half step angle of the one-to-two phase excitation due to the micro-step operation of the stepping motor which is the well known technique.

The motor driving section 67 rotates by the vertical scanning pulse 21. Further, the motor driving section 67 rotates according to the two phase excitation in accordance with instruction of the main controller (CPU and so forth) at the time of read-out of the same scale or the reduction. The motor driving section 67 rotates with half step angle at the time of the same scale or the reduction according to one-to-two phase excitation when enlargement exceeding 100% until 200% is carried out. The motor driving section 67 rotates with half step angle of the one-to-two phase excitation according to the micro-step operation when the enlargement of exceeding 200% until 400% is carried out.

Operation of the case realizing the enlargement in the vertical scanning direction using the motor driving section 67 will be described referring to the timing chart of FIG. 10. The timing chart of FIG. 10 shows the timing of 150% enlargement operation which is the same as that of the timing chart of FIG. 8.

At the time of 150% enlargement, the motor driving section 67 of FIG. 9 rotates with half step angle at the time of the same scaling or the reduction due to the one-to-two phase excitation. For that reason, the line in the vertical scanning direction is read-out with twice resolution at the time of the same scale or the reduction to supply to the scaling processor 20. Consequently, relationship between the vertical scanning pulse 68 and the input image 69 becomes as shown in FIG. 10.

Figure 10:
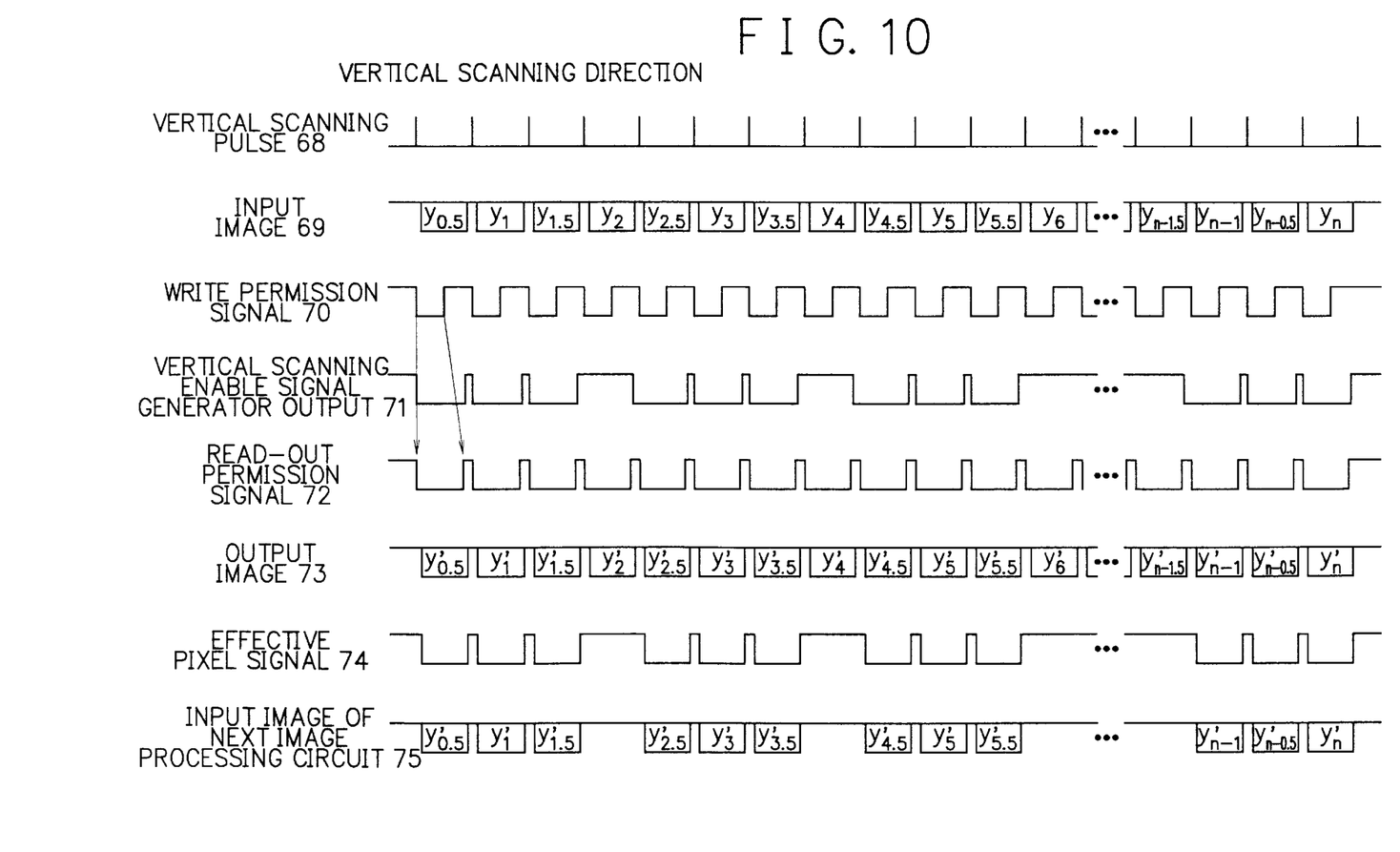
FIG. 10 is a timing chart showing operation at the time of enlargement in the vertical scanning direction of the embodiment of FIG. 9.

Here, the case of the timing chart of FIG. 10 is different from the case of the timing chart of FIG. 8 in that the signal inputted as the input image, in case of FIG. 8, is y1, y1, y2, y2, y3, y3, . . . , yn, yn to the contrary, in FIG. 10, the signal inputted as the input image becomes y(0.5), y(1), y(1.5), y(2), y(2.5), y(3), . . . , y(n−1), y(n−0.5), y(n).

In the case of FIG. 8, since the stepping motor rotates corresponding to one step each in every two times of the vertical scanning pulse, reading-out the same line with two times each, to the contrary, in FIG. 10, the stepping motor rotates corresponding to 0.5 step each in every one time of the vertical scanning pulse, thus it is capable of being read-out the intermediate portion between lines at the time of the same scaling (in FIG. 10, it is represented by y(0.5), y(1.5), y(2.5), . . . , y(n−0.5)).

With respect to operation after this, since it is the same as that of case mentioned above referring to FIG. 8, description is omitted. The final output image signal becomes as being the output image 73 of FIG. 10.

In the next stage of the image processing circuit (circuit for executing gamma correction, binarization and so forth), while the effective pixel signal 74 is effective, the output image 73 is inputted synchronized with the output image transfer clock 24 which is not illustrated in FIG. 10, so that the output image 73 becomes as being the input image 75 of the next image processing circuit, with the result that, it is capable of being carried out 150% enlargement of the image in the vertical scanning direction in all.

According to this method, it becomes to output the image whose distortion is decreased in the vertical scanning direction caused by enlargement. Further, since regardless of enlargement or reduction scaling factor, it is capable of making the pulse frequency of the stepping motor fixed by frequency of the vertical scanning pulse, there is the effect that it becomes easy to suppress influence which vibration of the stepping motor affects the image.

Furthermore, in the above described embodiment, the 1/2-frequency demultiplier and the 1/4-frequency demultiplier cause scanning speed in the vertical scanning direction to be 1/2 or 1/4. However, it is desirable that it causes the scanning speed to be decreased.

As described above, according to the image processing apparatus and the image processing method, and storage media thereof of the present invention, the image data of one line in the horizontal direction is stored therein, before generating prescribed reference pulse and thinned-out pulse which the reference pulse is thinned-out. The stored data is read-out based on the reference pulse or the thinned-out pulse, and the read-out data is outputted based on the reference pulse or the thinned-out pulse, thus scanning speed in the vertical direction is controlled in accordance with the scale factor in the vertical scanning direction. Since the stored data is thinned out in every one line unit according to the scale factor in the vertical scanning direction, it becomes possible to enlarge the image of the multi-gradation in the horizontal scanning direction and in the vertical scanning direction with arbitrary scale factor by simple configuration.

While preferred embodiments of the invention have been described using specific terms, the description has been for illustrative purpose only, and it is to be understood that changes and variations may be made without departing from the spirit or scope of the following claims.

What is claimed is:

1. An image processing apparatus which scans a manuscript in order to read-out an image of said manuscript comprising:

a storage means for storing an image data corresponding to one line in a horizontal scanning direction;

a first generation means for generating prescribed reference pulse;

a second generation means for generating a thinned-out pulse obtained in such a way that said reference pulse is thinned-out with a prescribed rate;

a read-out means for reading-out said image data stored in said storage means according to either said reference pulse or said thinned-out pulse;

an output means for outputting said image data read-out by said read-out means according to either said reference pulse or said thinned-out pulse;

a first changeover means for changing to be supplied either one between said reference pulse and said thinned-out pulse to said read-out means;

a second changeover means for changing to be supplied either one between said reference pulse and said thinned-out pulse to said output means;

a control means for controlling scanning speed in vertical scanning direction according to scale factor in the vertical scanning direction; and a thinning-out means for thinning-out said image data stored in said storage means in every one line unit according to scale factor in said vertical scanning direction.

2. An image processing apparatus as claimed in claim 1, wherein said control means permits said scanning speed in said vertical scanning direction to be slow down to enlarge the image in said vertical scanning direction, on the other hand, said thinning-out means carries out a thinning-out of said image data enlarged by said control means in every line unit in order to reduce the image in said vertical scanning direction, thus enlarging the image with arbitrary scale factor.

3. An image processing apparatus as claimed in claim 1, wherein a scanning in said vertical scanning direction is carried out by a stepping motor being operated synchronized with prescribed reference clock, and said control means consists of a frequency demultiplier which divides down said reference clock.

4. An image processing apparatus as claimed in claim 1, wherein the scanning in said vertical scanning direction is carried out by a stepping motor being operated synchronized with prescribed reference clock, and said control means controls said stepping motor by said reference clock in such a way that said stepping motor rotates in every angle of θ/N degrees (N is the M-th power of 2 (two), M is 0 or arbitrary natural number) on the supposition that the angle of θ is an angle which said stepping motor rotates in every one clock of said reference clock.

5. An image processing apparatus as claimed in claim 1, wherein said image processing apparatus further comprises a generation means for generating a signal to specify an effective pixel of said image data corresponding to one line stored in said storage means according to the scale factor in said horizontal scanning direction.

6. An image processing apparatus as claimed in claim 1, wherein said storage means is an FIFO memory which reads-out said image data stored therein in the stored order.

7. An image processing apparatus as claimed in claim 1, wherein said image data is an image data of multi-gradation, and said storage means stores therein said image data of multi-gradation.

8. An image processing method which scans a manuscript to read-out an image of said manuscript comprising the steps of:

a storage step for storing an image data corresponding to one line in the horizontal scanning direction;

a first generation step for generating prescribed reference pulse;

a second generation step for generating a thinned-out pulse obtained in such a way that said reference pulse is thinned-out with a prescribed rate;

a read-out step for reading-out said image data stored in said storage step according to either said reference pulse or said thinned-out pulse;

an output step for outputting said image data read-out in said read-out step according to either said reference pulse or said thinned-out pulse;

a first changeover step for changing reading-out of said image data in said read-out step according to which one between said reference pulse and said thinned-out pulse;

a second changeover step for changing output of said image data in said output step according to which one between said reference pulse and said thinned-out pulse;

a control step for controlling scanning speed in vertical scanning direction according to scale factor in said vertical scanning direction; and a thinning-out step for thinning-out said image data stored in the storage means at said storage step in every one line unit according to the scale factor in said vertical scanning direction.

9. A storage media for storing therein an image processing method as a program which is capable of being executed said image processing method that an image processing method which scans a manuscript to read-out an image of a manuscript comprising the steps of a storage step for storing an image data corresponding to one line in the horizontal scanning direction, a first generation step for generating prescribed reference pulse, a second generation step for generating a thinned-out pulse obtained in such a way that said reference pulse is thinned-out with a prescribed rate, a read-out step for reading-out said image data stored in said storage step according to either said reference pulse or said thinned-out pulse, an output step for outputting said image data read-out in said read-out step according to either said reference pulse or said thinned-out pulse, a first changeover step for changing reading-out of said image data in said read-out step according to which one between said reference pulse and said thinned-out pulse, a second changeover step for changing output of said image data in said output step according to which one between said reference pulse and said thinned-out pulse, a control step for controlling scanning speed in vertical scanning direction according to scale factor in said vertical scanning direction, and a thinning-out step for thinning-out said image data stored in the storage means at said storage step in every one line unit according to the scale factor in said vertical scanning direction.

* * * * *